United States Patent [19]

Parent et al.

[11] Patent Number: 5,137,583
[45] Date of Patent: Aug. 11, 1992

[54] EMISSION TECHNOLOGY

[75] Inventors: C. Robert Parent, Westwood; Brendan P. McFadden, Brockton, both of Mass.; Jens F. S. Olow, Lidingo, Sweden

[73] Assignee: White Consolidated Industries, Inc., Cleveland, Ohio

[21] Appl. No.: 686,754

[22] Filed: Apr. 17, 1991

[51] Int. Cl.⁵ .................. H01L 31/058; F23D 14/12; F21H 3/00
[52] U.S. Cl. ..................... 136/253; 431/100; 431/328
[58] Field of Search .............. 431/328, 100; 136/253

[56] References Cited

U.S. PATENT DOCUMENTS

| | | | |
|---|---|---|---|
| 2,285,944 | 6/1942 | Rigby | 431/328 |
| 2,775,294 | 12/1956 | Schwank | 431/328 |
| 3,208,247 | 9/1965 | Weil | 431/328 |
| 3,217,701 | 11/1965 | Weiss | 126/92 B |
| 3,472,601 | 10/1969 | Yamamura | 431/328 |
| 3,738,793 | 6/1973 | Reid et al. | 431/328 |
| 4,340,357 | 7/1982 | Kito et al. | 431/328 |
| 4,455,196 | 6/1984 | Craig et al. | 162/152 |
| 4,584,426 | 4/1986 | Nelson | 136/253 |
| 4,673,349 | 6/1987 | Abe et al. | 431/328 |
| 4,721,456 | 1/1988 | Granberg et al. | 431/328 |
| 4,746,287 | 5/1988 | Lannutti | 431/328 |
| 4,878,837 | 11/1989 | Otto | 431/328 |
| 4,900,245 | 2/1990 | Ahmady | 431/328 |
| 4,977,111 | 12/1990 | Tong et al. | 501/95 |

Primary Examiner—Aaron Weisstuch
Attorney, Agent, or Firm—Fish & Richardson

[57] ABSTRACT

An emission system includes emitter support structure with a plurality of flow passages therethrough and an array of emitter members that are in adjacent relation to the flow passages and that project outwardly from a surface of the support structure with the free ends of the emitter members spaced from one another and from the support structure (in the nature of cut pile or tufted rug structure in particular embodiments), and thermal excitation structure for flowing fuel through the passages and establishing a combustion condition at the surface to heat the emitter members to thermally emissive temperature.

36 Claims, 6 Drawing Sheets

EMISSION TECHNOLOGY

This invention relates to emission technology and more particularly to emission systems of the fuel burner type for providing radiant energy.

A variety of radiant emission systems are known, including for example, mantle systems and porous matrix burner systems. Porous matrix burner systems provide large, mechanically durable emitter structures, but the dense fiber mat tends to prevent generation of the high fiber temperatures that are frequently necessary to obtain selective emission such as is desirable for thermophotovoltaic applications, for example. Also, system constituents such as ceramic adhesives may tend to degrade burner performance as well as limiting emission system operating temperatures and emission system life.

In accordance with one aspect of the invention there is provided an improved emission system that includes emitter support structure with a plurality of flow passages therethrough and an array of emitter members that are in adjacent relation to the flow passages and that project outwardly from a surface of the support structure with the free ends of the emitter members spaced from one another and from the support structure (in the nature of cut pile or tufted rug structure in particular embodiments), and thermal excitation structure for flowing fuel through the passages and establishing a combustion condition at the surface to heat the emitter members to thermally emissive temperature. In preferred embodiments, the emitter members are elongated members of ceramic material; and may be selective emitters of rare earth metal oxide material such as ytterbia, erbia, terbia, or holmia; visible radiation emitters of rare earth metal oxide material such as thoria-ceria, or ytterbiaceria; broad band radiation emitters of a perovskite material such as lanthanum chromite, magnesium chromite, praseodymia, or lanthanum nickel oxide; or gray body emitters of material such as alumina, zirconia, or calcia.

The support structure may take various forms (planar, curved, etc.) and be of metal (for example, a stainless steel wire mesh), ceramic or other suitable high temperature material. The flow passages in the support structure may be created in various manners, for example, by molding or by selective disintegration of organic material. The emitter members may be of various configuration - loop type, elementary cantilever type, etc; and their density, cross-sectional dimension, length, etc. may be functions of thermal excitation aspects such as combustion zone configuration, fuel, oxidant, and flame type, e.g., premix or diffusion flame.

In particular embodiments, the emitter members are multi-filament ceramic strands that have cross-sectional dimensions in the range of 0.005-0.03 millimeter; the support member has a planar surface from which the emitter members extend; the free ends of the emitter members are disposed about one centimeter from that surface; the emitter members are disposed on the support member at a density of at least ten per square centimeter of support member surface; there are at least twice as many emitter members as ports in the support member surface; and the ports are disposed on the support member surface at a density of at least two per square centimeter. In one particular embodiment, the elongated emitter members extend generally perpendicularly from the planar surface, while in another embodiment, the elongated emitter members are inclined at acute angles to the planar surface and adjacent emitter members are inclined in opposite directions.

In particular embodiments, the thermal excitation structure includes a first group of channels for supplying fuel to a first array of ports in the support member and a second group of channels separate from the first group of channels for supplying oxidant to a second group of ports in the support member for establishing a diffusion flame condition at the support surface. In such embodiments, the emitters may be of various types including cantilever element type and loop type, and may be disposed perpendicularly to or at an angle to the support surface which may be planar or curved for example.

In accordance with another aspect of the invention, there is provided a process of manufacturing a radiant emission system that includes the steps of providing support structure that has a surface and passage structure in the support structure; disposing a multiplicity of elongated members of organic material imbibed with a nitrate compound in passages of the support structure, heating the support structure and the elongated members to convert the nitrate compound to ceramic emitter material with concurrent decomposition and removal of the organic material so that ceramic emitter members that are replicas of the elongated members of organic material remain, the emitter members being in spaced array and extending outwardly from the surface with end portions of the emitter members spaced from one another and from the support structure; and thermally exciting the emitter members by establishing a combustion condition adjacent the surface to heat the emitter members to thermally emissive temperature.

In preferred embodiments, the nitrate compound includes a material selected from the group consisting of aluminum, calcium, cerium, erbium, holmium, lanthanum, magnesium, neodymium, nickel, praseodymium, terbium, thorium, ytterbium, and zirconium; the emitter members are thermally excited by establishing a combustion energy density of at least twenty watts per square centimeter of the surface area of the support structure; and the process has a radiative efficiency of at least thirty percent. In a particular embodiment, the emitter members are thermally excited by flowing fuel through passage structure; and in another embodiment, the emitter members are thermally excited by establishing a diffusion flame condition adjacent the support structure surface.

The invention provides efficient, mechanically durable emission systems that may be of large area and/or provide substantial power densities, and have numerous applications, including thermovoltaic applications and the like. Other features and advantages of the invention will be seen as the following description of particular embodiments progresses, in conjunction with the drawings, in which.

Figure 1:
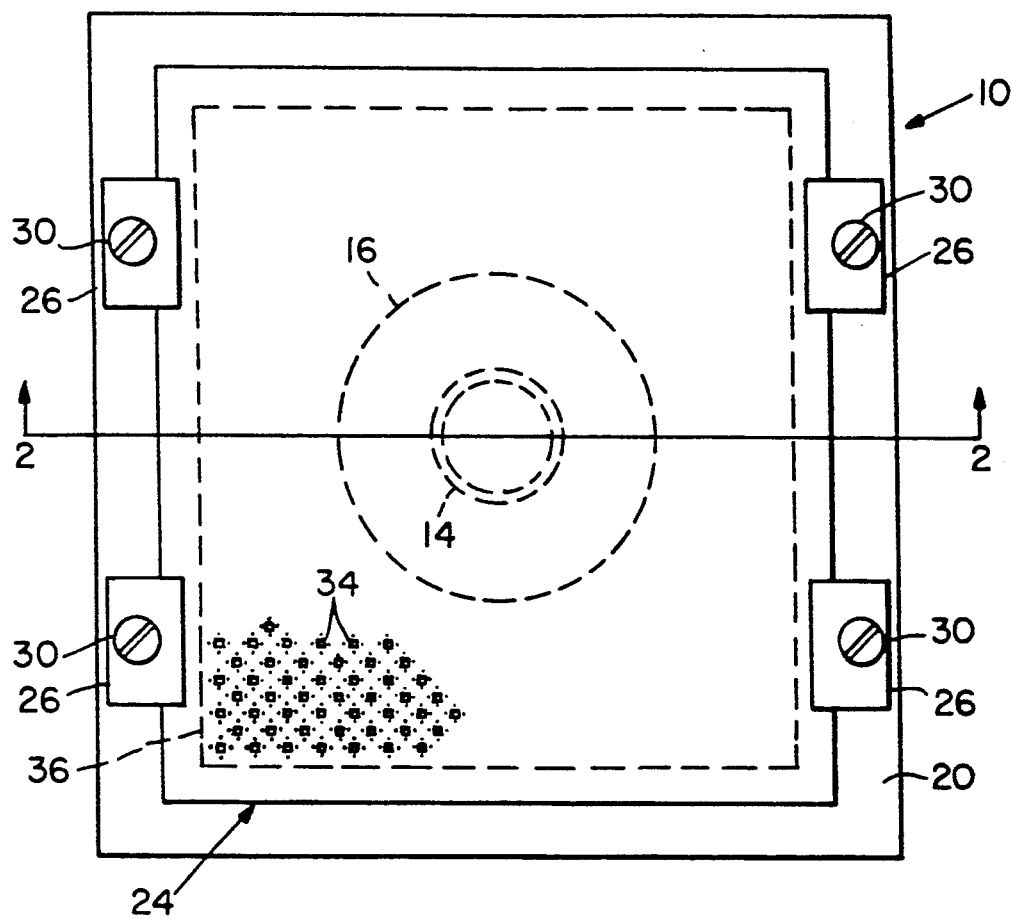
FIG. 1 is a diagrammatic plan view of an emission system in accordance with the invention.
Figure 3:
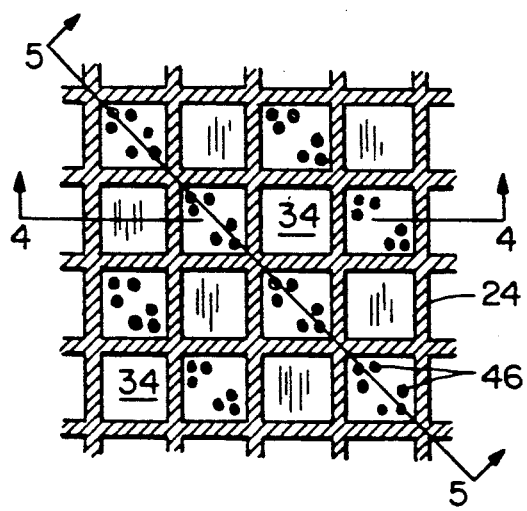
FIG. 3 is an enlarged diagrammatic view of a portion of the emission system shown in FIG. 1 taken along the line 3—3 of FIG. 5.
Figure 4:
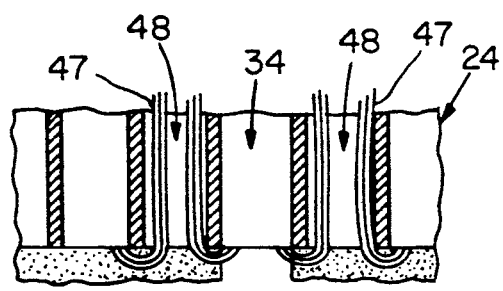
Figure 5:
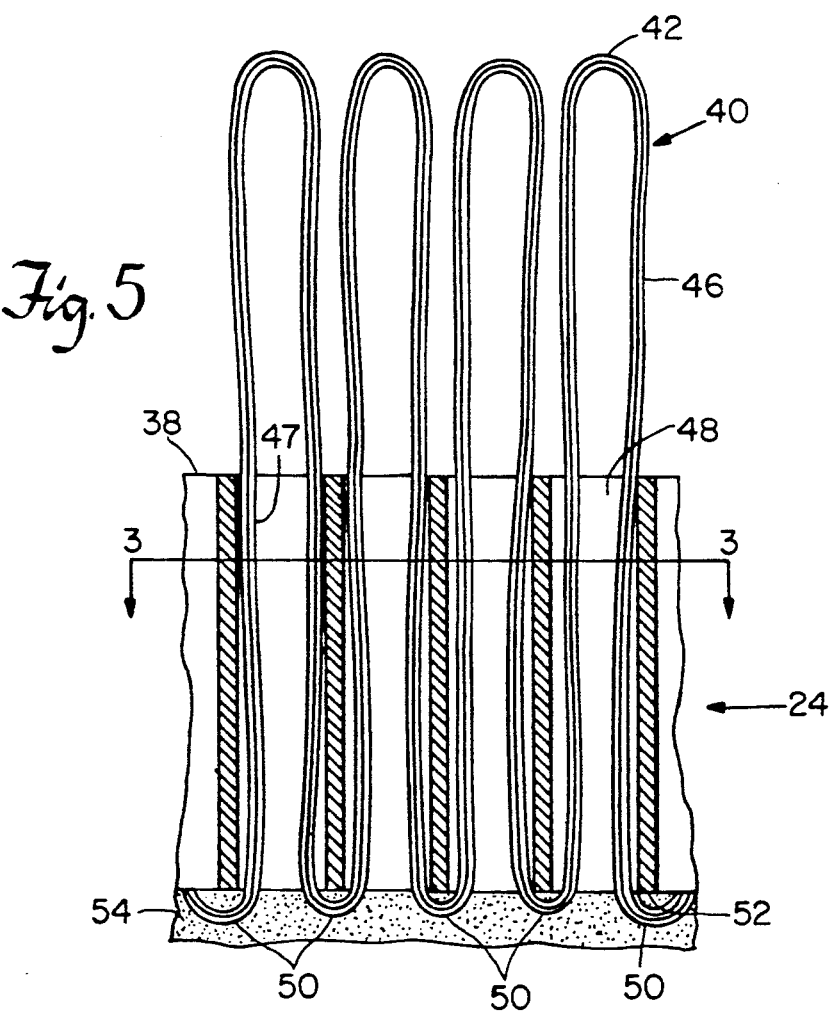
Figure 6:
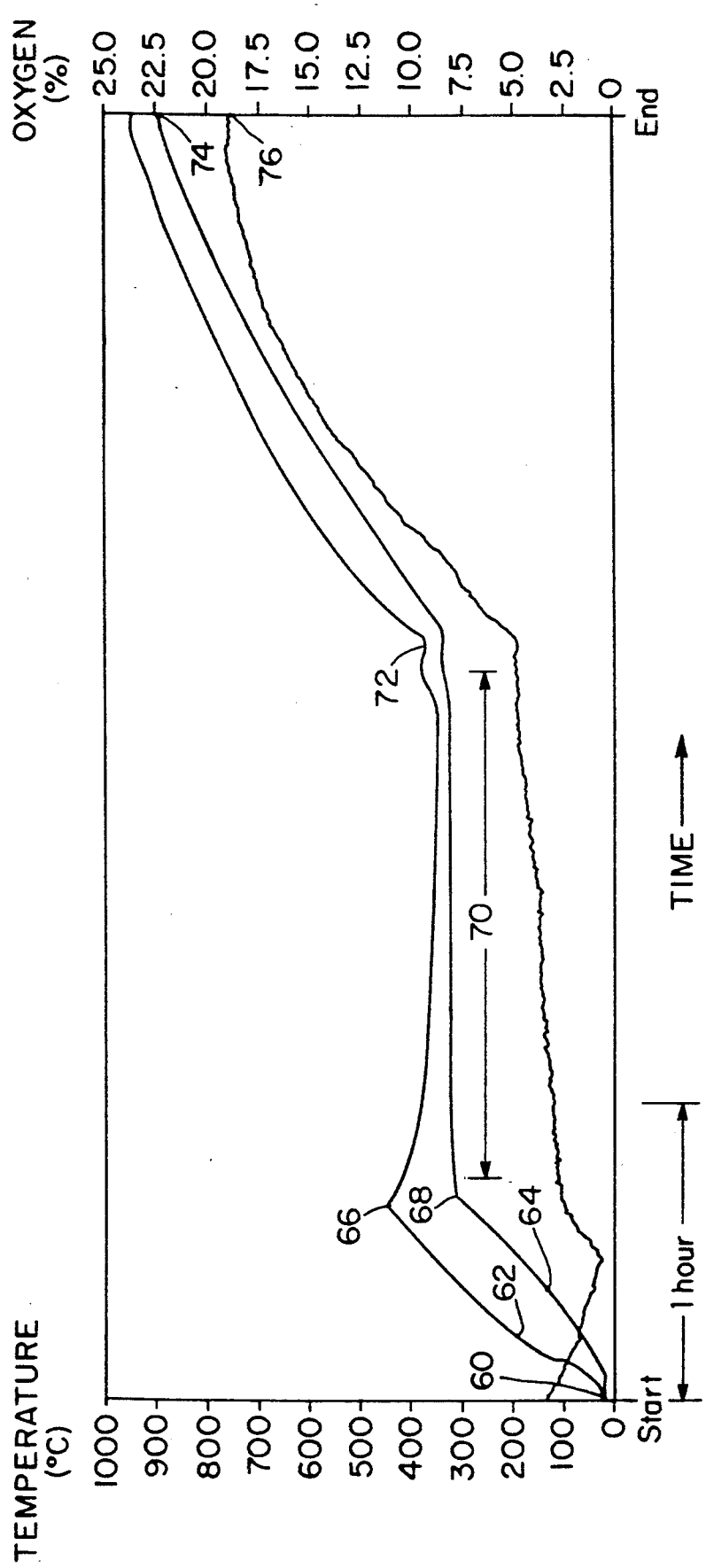
Figure 7:
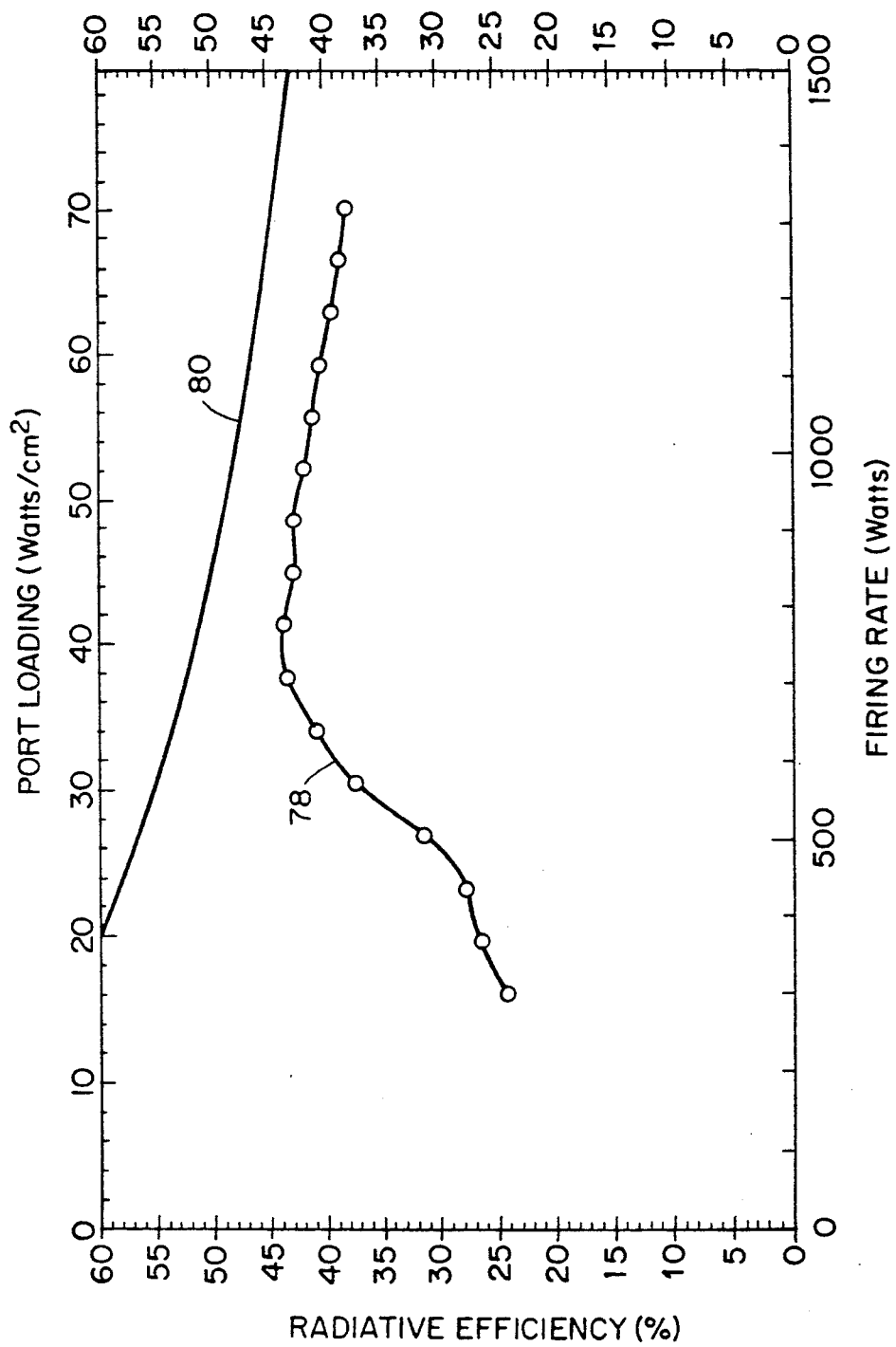
Figure 8:
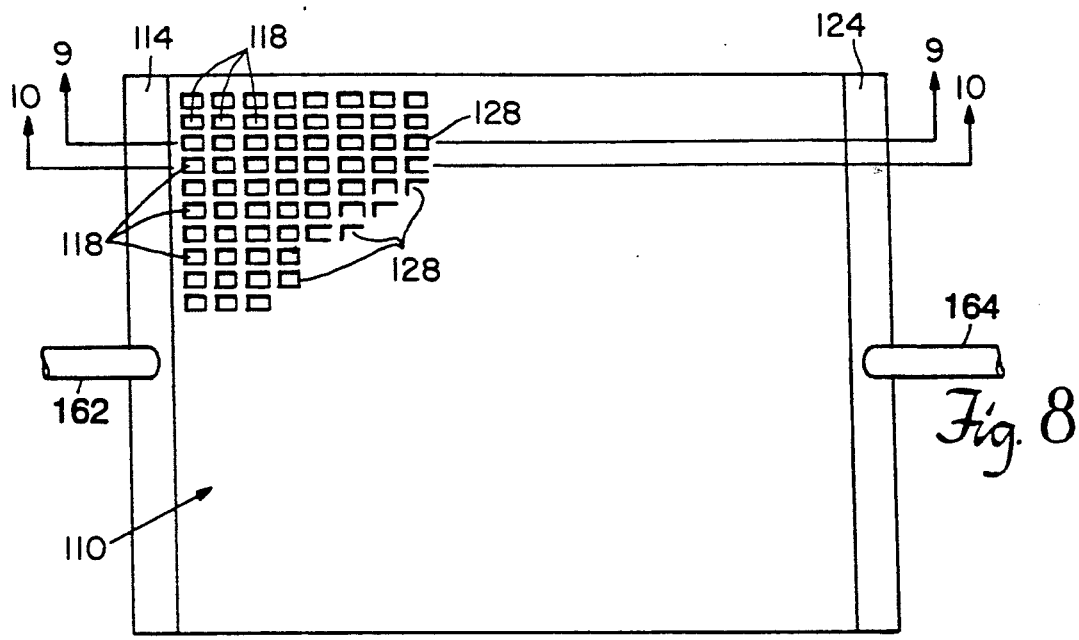
Figure 9:
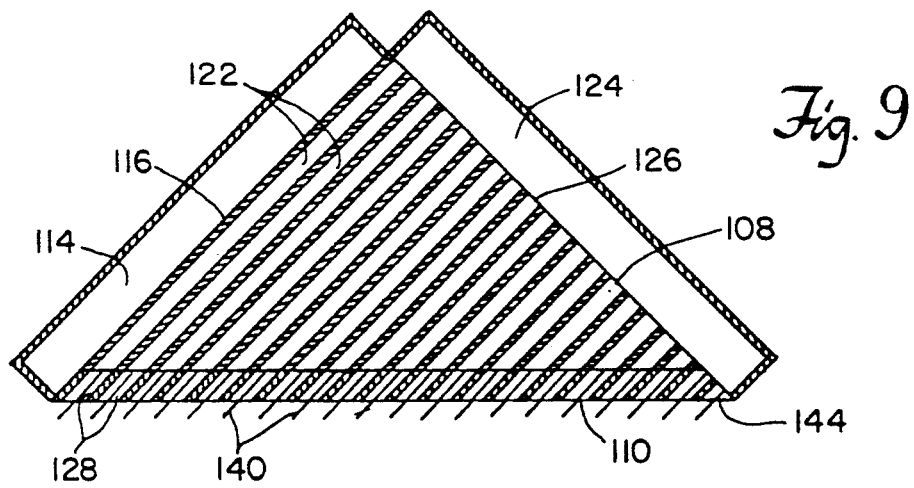
Figure 10:
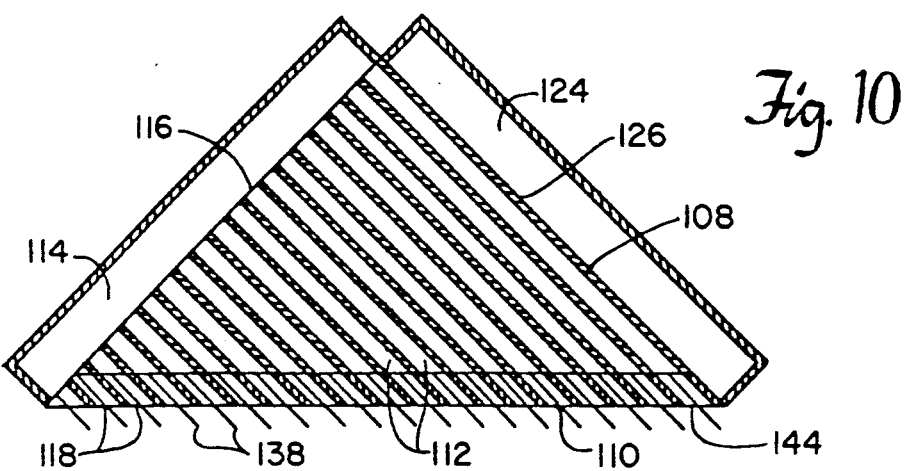
Figure 11:
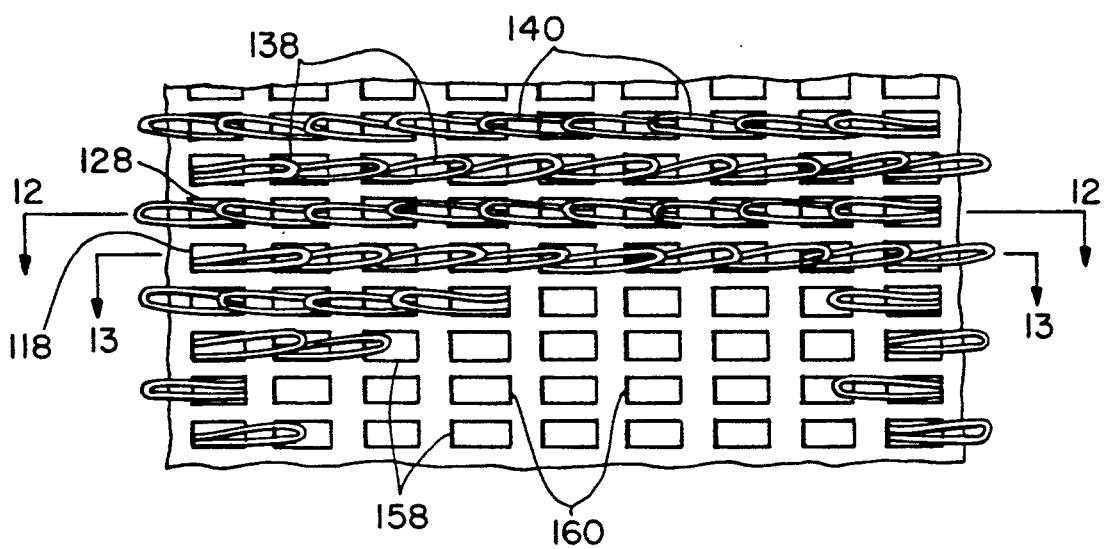
Figure 12:
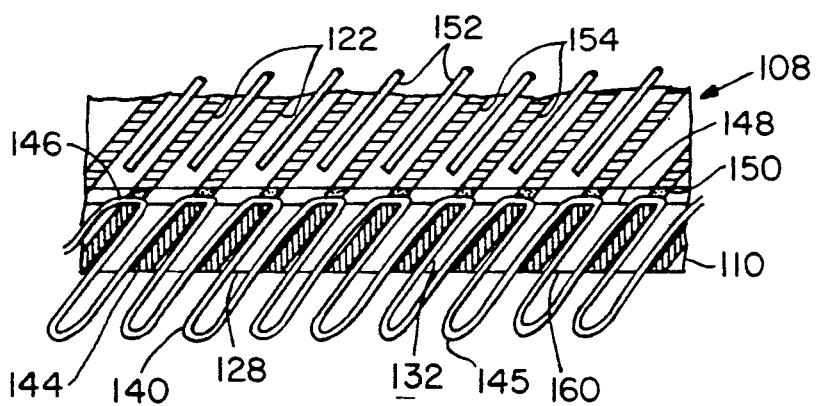
Figure 13:
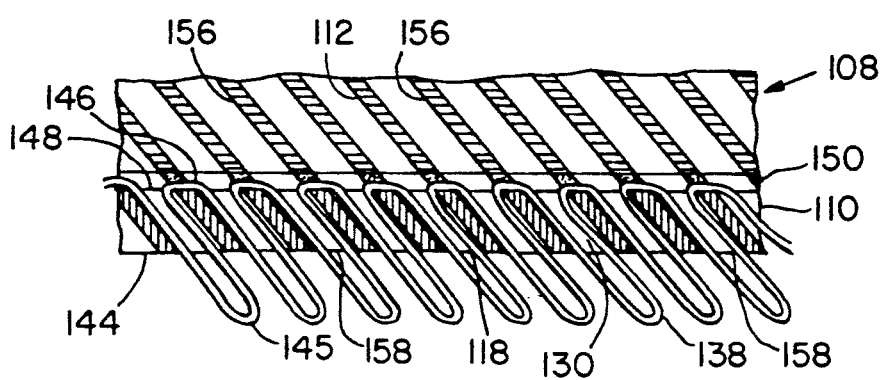

FIGS. 4 and 5 are sectional views taken along the lines 4—4 and 5—5 respectively of FIG. 3;

FIG. 6 is a graph showing a particular processing sequence for producing the emitter structure of FIG. 1;

FIG. 7 is a graph of radiant efficiency as a function of port loading and firing rate of the emitter system shown in FIG. 1;

FIG. 8 is a diagrammatic front view of another emission system in accordance with the invention;

FIGS. 9 and 10 are sectional views of the emission system of FIG. 8 taken along the lines 9—9 and 10—10 respectively of FIG. 8;

FIG. 11 is an enlarged diagrammatic view of a portion of the emission system shown in FIG. 8; and FIGS. 12 and 13 are sectional views taken along the lines 12—12 and 13—13 respectively of FIG. 11.

DESCRIPTION OF PARTICULAR EMBODIMENTS

Figure 2:
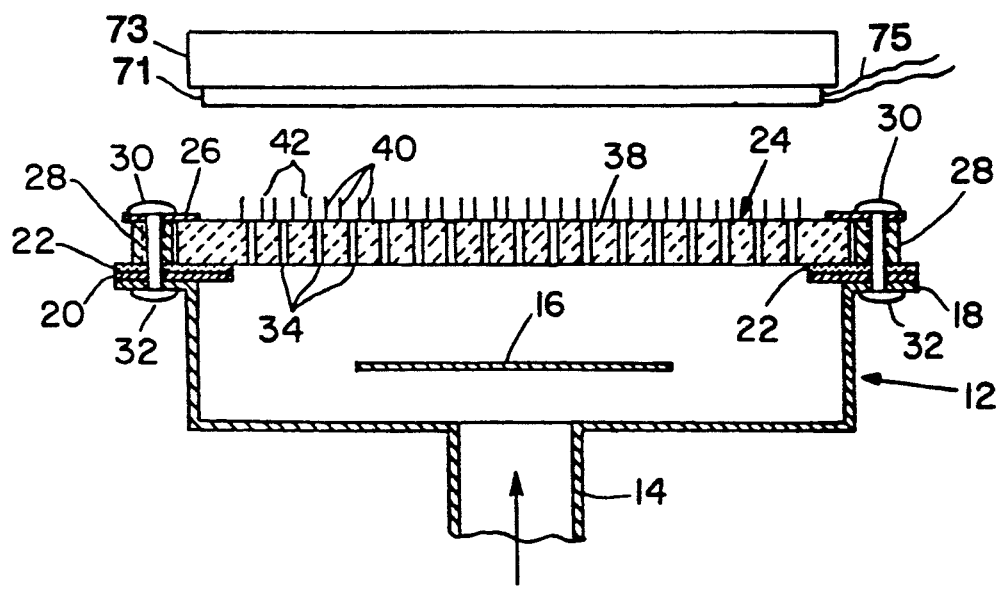
FIG. 2 is a sectional view of the emission system taken along the line 2-2 of FIG. 1.

Shown in FIGS. 1 and 2 is emission system 10 that includes stainless steel chamber 12 (about fifteen centimeters wide, fifteen centimeters long, and five centimeters deep) with fuel conduit 14. Diffuser baffle 16 is disposed in chamber 12 in front of the outlet of conduit 14. Chamber 12 has flange 18 on which is mounted stainless steel apertured plate 20, silica-alumina gasket 22 and cordierite (Celcor) support 24. Clamp plates 26, that are secured to flange 18 with internally threaded posts 28 and fasteners 30, 32, seat ceramic support member 24 in sealed relation on the top of chamber 12.

Ceramic support 24 has a thickness of about one centimeter and is about twenty centimeters wide and twenty centimeters long. Formed in support 24 is an array of parallel fuel passages 34 (each of about one square millimeter flow area) that are spaced about 0.4 centimeter apart in regular diamond-like array at a density of about seven passages per square centimeter over an active area (indicated by dotted line 36) that is about fourteen centimeters wide and about fourteen centimeters long. Upstanding elongated cantilever-type emitter elements 40 are disposed in regular array at a density of about fifty per square centimeter over active area 36. Four elements 40 are disposed in surrounding array and adjacent (within about one millimeter) to each fuel passage 34. Each emitter element 40 is in the form of elongated cantilever-type loops of perovskite filaments, the tips 42 of which are about eight millimeters from front surface 38 of support 24.

The emitters 40 are of continuous lanthanum nickel oxide multi-filament fibers in the form of multi-filament strands 46 and, as indicated in FIGS. 4 and 5, include cantilever-type loop portions that are upstanding from front surface 38. Intermediate portions 47 of the strands 46 extend through passages 48 parallel to fuel passages 34 in support 24 to connecting portions 50 that are secured at the rear surface 52 of support 24 by alumina cement 54. Cross-sectional dimensions of individual fibers of a strand 46 are in the range of five to ten micrometers and each strand 46 has a cross-sectional dimension of about 0.2 millimeter.

The lanthanum nickel oxide emitter assembly is made as follows. 300 denier/50 filament rayon yarn is soaked for ten minutes at room temperature in an aqueous imbibing mixture that contains one hundred cubic centimeters of 1.27 molar lanthanum nitrate and one hundred cubic centimeters of 1.263 molar nickel nitrate. The imbibed yarn is pressed and then centrifuged for about ten minutes to remove excess liquid.

Support 24 has an array of parallel channels 48 (each of about one square millimeter area) that are spaced about 1.4 millimeter apart in regular array at a density of about fifty channels 48 per square centimeter. After the imbibed yarn is dried, the yarn is inserted as loops into selected channels 48 (every channel in alternate diagonal lines) in support 24 as indicated in FIGS. 3–5. Three strands of the imbibed 300 denier/50 fibril yarn are threaded through each selected channel 48 along alternate diagonals as indicated in FIGS. 3 and 5, effectively placing six parallel yarn strands in each selected channel 48 as diagrammatically indicated in FIG. 3. The support 24 with the threaded yarn loops is placed in a retort so that support 24 is horizontal and the loops extend downwardly. The retort (with support 24 and inserted yarn loops) is placed in an Electra Products furnace Model 121925, Series 2100R, and processed as indicated in the graph of FIG. 6. At ambient temperature (about 20° C., indicated at point 60 in FIG. 6), the retort is evacuated with a mechanical vacuum pump and backfilled with nitrogen, and then nitrogen is flowed through the retort is at a flow rate of about 2.34 liters per minute. With this inert atmosphere in the retort, the furnace temperature is increased at a rate of about 14° C. per minute as indicated by line 62. The yarns undergo "nitrate burn" at about 130° C. (point 64). At that time, the yarn color changes rapidly from white to golden tan. Heating continues to increase at a rate of 14° C. per minute as indicated by line 62 to a temperature of about 440° C. (point 66) which produces a retort temperature of about 320° C. (point 68). During this interval, the yarn color continuously changes from golden tan to dark brown or black with modest shrinkage (about ten percent) of the yarn loops, indicating additional decomposition of the organic rayon yarn material. Air is added to the nitrogen flow rate through the retort of about 2.34 liters per minute to provide a retort atmosphere of about five percent oxygen while the retort temperature is held at about 320° C. for about 1 hour and 50 minutes. During this soaking interval 70, the remaining carbon is oxidized and driven off and each dimension of the yarn shrinks to about ⅔ its original dimension so that the tips 42 of the yarn loops extend about eight millimeters above support surface 38. At the end of the soaking interval (point 72), the furnace temperature is increased from about 380° C. to about 950° C. over about one hundred minutes (a ramp rate of about 5° C. per minute) to a final retort temperature of about 900° C. (point 74) and an oxygen content in the retort of about eighteen percent (point 76). The furnace heater is then turned off and the furnace allowed to cool to ambient temperature.

The emitter subassembly is removed from the retort and sintered at 1400° C. for one hour in a modified Lindberg furnace; and after cooling, alumina cement 54 (Ceramabond 569) (FIG. 5) is applied to secure connecting portions 50 of the ceramic fiber loops 42 at the rear surface of support 24 and to block excess channels 48 of support 24 that are not to be fuel passages 34 (alternate channels in each diagonal row of fuel passages 34 and all channels in every fourth diagonal row). The emitter subassembly is then secured to the fuel chamber 12 (as indicated in FIGS. 1 and 2).

Radiative efficiency of the perovskite emission system of FIG. 1 is indicated in FIG. 7. As there indicated by line 78, the emission system 10 has a radiative efficiency of about forty percent over a range of port loadings from thirty-five to sixty watts per square centimeter—an efficiency reasonably close to ideal (theoretical) radiative efficiency indicated by line 80; and at firing rates from six hundred to twelve hundred watts and above.

In another example, 300 denier/50 fiber rayon yarn (eight twists per inch) was imbibed in a 1.75 molar ytterbium nitrate solution for about ten minutes at room temperature with gentle agitation to promote penetration of the imbibing solution into the rayon fibers. After the ten minute inhibition, the yarn was removed from the solution, squeezed dried and centrifuged for ten minutes to remove surface liquid. After centrifugation, the imbibed yarn was grouped into three strands and the strands inserted through channels 48 in ceramic (Celcor) support 24 (of the type shown in FIGS. 1 and 2) with the tips of the loops projecting above upper surface 38. The support 24 with imbibed yarn loops was then subjected to a firing procedure to convert the ytterbium nitrate imbibed cellulosic yarn into densified ytterbia emitter members.

In the firing sequence, at ambient temperature, the retort was flushed with tank nitrogen at a flow rate of 250 centimeters per minute and with this atmosphere in the retort, furnace temperature was increased at a rate of about 7° C. per minute. The yarn undergoes denitration at about 160° C., at which point the yarn color changes rapidly from white to golden tan. Immediately after this color change, oxygen is added to the nitrogen flow at a rate of five cubic centimeters per minute. Heating continues at the same rate to a retort temperature of about 320° C. During this time, the yarn color changes continuously from golden tan to dark brown or black with modest shrinkage (about ten percent), indicating partial decomposition of the organic material. The retort temperature is held at 320° C. for about 1½ hours and the yarn color turns from black to light gray or white. During this soaking interval, the remaining carbon is oxidized and driven off and the yarn shrinks to about ⅓ its original dimension. At the end of the soaking interval, the flow of oxygen is increased to about fifty cubic centimeters per minute and the furnace temperature is increased over a twenty-four minute interval to a temperature of 900° C. The furnace is then turned off and rapidly cooled to ambient temperature. After cooling, the emitter subassembly may be exposed to a burning mixture of propane and air (at an estimated emitter fiber temperature of about 1,700° C.) for five minutes to further shrink and densify the ytterbia yarn.

The resulting cantilevered, loop-type ytterbia emitter elements 40, in visual appearance, substantially retain characteristic physical textile attributes of their precursor rayon yarn, although they are substantially reduced in dimension. The ytterbia emitters have relatively high density, have flexibility and have minimal defects (flaws) microstructures. The tips 42 may be retained, or in another embodiment, the tips may be removed (either before or after thermal denitration) to provide an emitter array of the 'cut-pile' type, in which multiple upstanding ytterbia fibers have free ends spaced from support 24.

The processed ytterbia emitter subassembly is then assembled to a suitable fuel chamber structure, for example, structure 12 shown in FIGS. 1 and 2, and thermally energized by establishing an air-propane flame at surface 38 with an adiabatic flame temperature of about 2,200K and maintained so that the maximum flame temperature is in the vicinity of the tips 42 of the upstanding yarn loops 40 (slightly less than one centimeter from support surface 38). The spectral irradiance profile of the emission system has a radiation peak at about 985 nanometers with half intensity points at about 890 nanometers and 1050 nanometers, respectively, and the radiation peak of the emission system has a full width at half maximum of about 150 nanometers. In a thermophotovoltaic system, a silicon photocell array 71 with output leads 75 is mounted on the underside of a support 7 in spaced juxtaposition with the emitter array, as indicated in FIG. 2. In another embodiment, an erbia emitter array is used in juxtaposition with a germanium photocell array.

Another embodiment is shown in FIGS. 8–13. That emitter system, as indicated in FIGS. 8–10, includes ceramic body 108 of the crossflow recuperator type and ceramic support member 110 that is an extension of body 108 and has been cut from body 108 along a diagonal. Upstanding elongated cantilever-type emitter elements 138, 140 are disposed in regular array over the active area of the face of support member 110 (emitter elements 138, 140 not being shown on FIG. 8 for clarity). The emitter members 138 (in alternate rows) are inclined orthogonally to the emitter members 140 in the immediately adjacent rows above and below. (In another embodiment, the emitter members may extend perpendicularly to the face of support member 110, with diffusion flame supply passages in support member 110 that also extend perpendicularly to the face of support member 110 and are aligned with corresponding flow channels 112 and 122 in crossflow recuperator member 108.) Body 108 and support member 110 have a first group of spaced parallel arrays of flow channels 112 that are disposed in rows and that extend from plenum 114 coupled to rear face 116 of body 108 to ports 118 in ceramic support member 110; and a second group of planar arrays of flow channels 122 that are orthogonal to and are disposed in rows that alternate with the rows of the planar arrays of channels 112 and that extend from plenum 124 coupled to rear face 126 through body 108 and support member 110 to ports 128 in the face of support member 110.

As indicated in FIGS. 11–13, support member 110 has a thickness of about one-half centimeter and includes arrays of passages 130, 132 that are aligned with and are extensions of channels 112, 122 in body 108 and terminate in ports 118, 128, respectively. Disposed in orthogonal passages 130, 132 in support member 110 are upstanding emitter members 138, 140, respectively. Each emitter member is a group of ceramic fiber loops that extends at an angle of about 45° to face 144 of member 110, and outwardly to tips 145 at a distance of about six millimeters from face 144, the emitter members 138 in each alternate row being inclined in the same direction, and the emitter members 140 (in the other alternate rows) being inclined orthogonally to the emitter members 138 in the immediately adjacent rows above and below. The ceramic loops are of material such as a perovskite or a rare earth metal oxide and are processed as described above. Connecting portions 146 are secured against rear surface 148 of support 110 with an appropriate ceramic cement 150. An array of small, thermally insulated fuel pipes (diagrammatically indicated at 152 in FIG. 12) may extend in manifold configuration from plenum 124 into fuel channels 154 to reduce fuel cracking in the high temperature burner environment.

In use, preheated combustion air is supplied through a conduit diagrammatically indicated at 162 to plenum 114 for flow through oxidant channels 156 to ports 158, and fuel is supplied to plenum 124 through a conduit diagrammatically indicated at 164 for flow through optional pipes 152 in fuel channels 154 to ports 160. A diffusion flame is established and stabilized on surface 144 and heats the emitters 138, 140 to thermally emissive temperatures, with the maximum flame temperature located in the vicinity of tips 145 of the upstanding cantilevered ceramic yarn loops. In a thermophotovoltaic system, a silicon photocell array may be disposed in spaced juxtaposition with an ytterbia emitter array; and in another embodiment, an erbia emitter array is used in juxtaposition with a germanium photocell array.

While particular embodiments of the invention have been shown and described, various modifications will be apparent to those skilled in the art, and therefore, it is not intended that the invention be limited to the disclosed embodiments or to details thereof, and departures may be made therefrom within the spirit and scope of the invention.

What is claimed is:

1. An emission system comprising
   support structure having front and rear surfaces, said support structure having a plurality of passages that extend therethrough from said rear surface to a plurality of ports in said front surface,
   a multiplicity of elongated emitter members extending through said passages of said support structure, said emitter members being in spaced array and extending outwardly from said surface with end portions of said emitter members spaced from one another and from said support structure,
   bonding material at said rear surface securing said emitter members to said support structure, and
   thermal excitation structure for establishing a combustion condition adjacent said surface to heat said emitter members to thermally emissive temperature.

2. The system of claim 1 wherein said emitter members are of ceramic material.

3. The process of claim 1 wherein said emitter members are selected from the group of selective emitters of rare earth metal oxide material, visible radiation emitters of rare earth metal oxide material, broad band radiation emitters of perovskite material, and gray body emitter material.

4. The system of claim 1 where said emitter members are of material selected from the group consisting of alumina, calcia, ceria, erbia, holmia, lanthanum chromite, lanthanum nickel oxide, magnesium chromite, neodymia, praseodymia, terbia, thoria, ytterbia, and zirconia.

5. The system of claim 1 wherein said emitter members are composed of multi-filament ceramic strands that have cross-sectional dimensions in the range of 0.005–0.03 millimeter.

6. The system of claim 1 wherein said front surface of said support member is planar.

7. The system of claim 1 wherein the tips of said emitter members are disposed less than about one centimeter from said front surface.

8. The system of claim 1 wherein said emitter members extend generally perpendicularly outwardly from said front surface.

9. The system of claim 1 and further including a photocell array in spaced juxtaposition to said support structure to provide a thermophotovoltaic system.

10. The system of claim 9 wherein said emitter members are of the ytterbia type and said photocell array is of the silicon type.

11. The system of claim 9 wherein said emitter members are of the erbia type and said photocell array is of the germanium type.

12. The system of claim 1 wherein said thermal excitation structure includes a first group of channels for supplying fuel to a first group of said discharge ports in said support member front surface and a second group of channels separate from said first group of channels for supplying oxidant to a second group of discharge ports in said support member front surface to establish a diffusion flame condition at said support member front surface.

13. The system of claim 1 wherein said emitter members are disposed on said support structure at a density of at least ten per square centimeter of said support member front surface.

14. The system of claim 1 wherein said support structure has a plurality of flow passages that extend therethrough to a plurality of ports in said front surface, and each said port in said surface has a flow area of about one square millimeter.

15. The system of claim 1 wherein there are at least twice as many emitter members as said ports in said front surface.

16. The system of claim 1 wherein a plurality of said emitter members are disposed generally orthogonally to adjacent emitter members and extend outwardly at acute angles from said front surface.

17. The system of claim 1 wherein said emitter members are of loop-type configuration.

18. The system of claim 17 wherein said emitter members are disposed on said support structure at a density of at least ten per square centimeter of said support member front surface, said support structure has a plurality of flow passages that extend therethrough to a plurality of ports in said surface, and said front ports are disposed on said support structure at a density of at least two per square centimeter of said support member front surface.

19. The system of claim 18 wherein each said port in said front surface has a flow area of about one square millimeter.

20. The system of claim 18 wherein said emitter members are of ceramic material selected from the group consisting of alumina, calcia, ceria, erbia, holmia, lanthanum chromite, lanthanum nickel oxide, magnesium chromite, neodymia, praseodymia, terbia, thoria, ytterbia, and zirconia.

21. The system of claim 20 wherein said emitter members are composed of multi-filament strands that have cross-sectional dimensions in the range of 0.005–0.03 millimeter.

22. The system of claim 21 wherein said front surface of said support member is planar, said emitter members extend generally perpendicularly outwardly from said front surface, and the tips of said emitter members are disposed less than about one centimeter from said front surface.

23. The system of claim 22 and further including a photocell array in spaced juxtaposition to said support structure to provide a thermophotovoltaic system.

24. The system of claim 22 wherein there are at least twice as many emitter members as said ports in said front surface.

25. The system of claim 22 wherein said thermal excitation structure includes a first group of channels for supplying fuel to a first group of said discharge ports in said support member front surface and a second group of channels separate from said first group of channels for supplying oxidant to a second group of discharge ports in said member front surface to establish a diffusion flame condition at said support surface.

26. A process of manufacturing and operating a radiant emission system comprising the steps of
providing support structure having front and rear surfaces, said support structure having a plurality of passages that extend therethrough from said rear surface to a plurality of ports in said front surface,
disposing a multiplicity of elongated members of organic material imbibed with a nitrate compound extending through said passages of said support structure with portions of said members projecting outwardly from said front surface of said support structure,
heating said support structure and said elongated members to convert said nitrate compound to a ceramic emitter material with concurrent decomposition and removal of said organic material, said ceramic emitter members being replicas of said elongated members of said organic material,
said emitter members being in spaced array and extending outwardly from said front surface with end portions of said emitter members spaced from one another and from said support structure, and
thermally exciting said emitter members by establishing a combustion condition adjacent said front surface to heat said emitter members to thermally emissive temperature.

27. The process of claim 26 wherein said nitrate compound includes a material selected from the group consisting of aluminum, calcium, cerium, erbium, holmium, lanthanum, magnesium, neodymium, nickel, praseodymium, terbium, thorium, ytterbium, and zirconium.

28. The process of claim 26 wherein said support structure includes passage structure, and said emitter members are thermally excited by flowing fuel through said passage structure and igniting said fuel to establish a combustion condition adjacent said support structure surface.

29. The process of claim 26 wherein said emitter members are thermally excited by establishing a diffusion flame condition adjacent said surface of said front support structure.

30. The process of claim 26 wherein said emitter members are thermally excited by establishing a combustion energy density of at least twenty watts per square centimeter of the area of said front surface of said support structure.

31. The process of claim 26 wherein said process has a radiative efficiency of at least thirty percent.

32. The process of claim 26 wherein said imbibed elongated members of organic material are of elongated fiber type and extend in loop configuration through said passages of said support structure.

33. The process of claim 26 wherein said emitter members are selected from the group of selective emitters of rare earth metal oxide material, visible radiation emitters of rare earth metal oxide material, broad band radiation emitters of perovskite material, and gray body emitter material.

34. The process of claim 33 wherein said emitter members are thermally excited by establishing a combustion energy density of at least twenty watts per square centimeter of the area of said front surface of said support structure, and said process has a radiative efficiency of at least thirty percent.

35. The process of claim 34 wherein said support structure includes passage structure, and said emitter members are thermally excited by flowing fuel through said passage structure and igniting said fuel to establish a combustion condition adjacent said support structure front surface.

36. The process of claim 34 wherein said emitter members are thermally excited by establishing a diffusion flame condition adjacent said front surface of said support structure.

* * * * *